US009562205B2

(12) United States Patent
Malavasi et al.

(10) Patent No.: US 9,562,205 B2
(45) Date of Patent: Feb. 7, 2017

(54) COMBUSTION PROCESS FOR THE REDUCTION OF PARTICULATES IN COMBUSTION FUMES

(75) Inventors: Massimo Malavasi, Milan (IT); Grazia Di Salvia, Bari (IT); Edoardo Rossetti, Bologna (IT)

(73) Assignee: ITEA S.P.A., Bologna (IT)

( * ) Notice: Subject to any disclaimer, the term of this patent is extended or adjusted under 35 U.S.C. 154(b) by 992 days.

(21) Appl. No.: 12/744,591

(22) PCT Filed: Nov. 27, 2008

(86) PCT No.: PCT/EP2008/010054
§ 371 (c)(1),
(2), (4) Date: May 25, 2010

(87) PCT Pub. No.: WO2009/071230
PCT Pub. Date: Jun. 11, 2009

(65) Prior Publication Data
US 2010/0261126 A1    Oct. 14, 2010

(30) Foreign Application Priority Data
Dec. 6, 2007 (IT) .............................. MI2007A2291

(51) Int. Cl.
| | |
|---|---|
| *F23J 7/00* | (2006.01) |
| *C10L 10/02* | (2006.01) |
| *C10L 1/12* | (2006.01) |
| *C10L 10/00* | (2006.01) |
| *C10L 10/04* | (2006.01) |
| *F23C 9/00* | (2006.01) |
| *F23C 99/00* | (2006.01) |
| *F23G 5/02* | (2006.01) |
| *F23L 7/00* | (2006.01) |

(52) U.S. Cl.
CPC ................ *C10L 10/02* (2013.01); *C10L 1/12* (2013.01); *C10L 1/1233* (2013.01); *C10L 10/00* (2013.01); *C10L 10/04* (2013.01); *F23C 9/00* (2013.01); *F23C 99/00* (2013.01); *F23G 5/02* (2013.01); *F23J 7/00* (2013.01); *F23L 7/007* (2013.01); *C10L 1/125* (2013.01); *C10L 1/1283* (2013.01); *C10L 1/1291* (2013.01); *F23C 2202/30* (2013.01); *F23C 2900/99001* (2013.01); *F23G 2201/701* (2013.01); *F23G 2202/106* (2013.01); *Y02E 20/322* (2013.01); *Y02E 20/342* (2013.01); *Y02E 20/344* (2013.01)

(58) Field of Classification Search
USPC ............ 431/4; 110/342, 345, 218, 341, 343; 423/215.5; 44/457
See application file for complete search history.

(56) References Cited

U.S. PATENT DOCUMENTS

| | | | | |
|---|---|---|---|---|
| 3,692,503 A | * | 9/1972 | Kukin | 44/354 |
| 3,925,001 A | * | 12/1975 | Salooja | 431/4 |
| 4,170,447 A | * | 10/1979 | Goldstein | B03C 1/015 110/342 |
| 4,462,810 A | * | 7/1984 | Jessup | C10L 1/182 44/358 |
| 4,470,958 A | * | 9/1984 | van Gelder et al. | 423/210.5 |
| 4,512,774 A | * | 4/1985 | Myers et al. | 44/301 |
| 4,522,631 A | * | 6/1985 | Mourao et al. | 44/364 |
| 4,542,704 A | * | 9/1985 | Brown et al. | 110/347 |
| 4,771,712 A | * | 9/1988 | Engstrom et al. | 110/347 |
| 4,808,194 A | * | 2/1989 | Najjar et al. | 44/280 |
| 4,881,476 A | * | 11/1989 | Becker | F23C 3/008 110/264 |
| 5,261,225 A | * | 11/1993 | Dickinson | C02F 11/086 110/238 |
| 5,461,854 A | * | 10/1995 | Griffin, Jr. | F01K 21/047 60/39.53 |
| 5,480,624 A | * | 1/1996 | Kuivalainen | B01D 53/68 423/210 |
| 5,535,687 A | * | 7/1996 | Khanna | F22B 31/0069 110/245 |
| 5,562,884 A | * | 10/1996 | Oakes | B01D 53/56 110/245 |
| 5,593,464 A | * | 1/1997 | Cook et al. | 44/362 |
| 5,972,301 A | * | 10/1999 | Linak | A62D 3/33 110/344 |
| 6,063,147 A | * | 5/2000 | Winter | C02F 11/10 44/593 |

(Continued)

FOREIGN PATENT DOCUMENTS

WO    WO 2007/120262 A2    10/2007

OTHER PUBLICATIONS

EU PM Emissions Brussels, Apr. 14, 2008 IP/08/570 http://europa.eu/rapid/press-release_IP-08-570_en.htm.*

*Primary Examiner* — Avinash Savani
*Assistant Examiner* — George R Blum
(74) *Attorney, Agent, or Firm* — Arent Fox LLP

(57) ABSTRACT

A combustion process wherein a fuel, a comburent and component A) are fed to a combustor, component A), comprising low-melting salts and/or oxides having a melting temperature ≤1,450 K, the ratio by moles A'/(A"−A')≥0.01, being: A' the sum by moles between the amount of metals, under the form of low-melting salts and/or low-melting oxides present in the component A) and the amount of metals under the form of the low-melting salts and/or low-melting oxides or their low-melting mixtures, contained in the fuel, A" is the sum of the amount of all the metals contained in the fuel and of those contained in component A), in which the combustor is isothermal type and flameless.

12 Claims, No Drawings

(56) References Cited

U.S. PATENT DOCUMENTS

| | | | |
|---|---|---|---|
| 6,282,880 B1* | 9/2001 | Wallace | C01B 3/025 |
| | | | 423/237 |
| 7,524,338 B2* | 4/2009 | Pedrazzini | 44/365 |
| 7,971,540 B2* | 7/2011 | Radway | 110/342 |
| 8,196,533 B2* | 6/2012 | Leach et al. | 110/345 |
| 2003/0079665 A1* | 5/2003 | Atreya | F23C 6/04 |
| | | | 110/345 |
| 2003/0182848 A1* | 10/2003 | Collier et al. | 44/358 |
| 2006/0059768 A1* | 3/2006 | Wallenbeck et al. | 44/354 |
| 2007/0039527 A1* | 2/2007 | Malavasi | F23G 5/006 |
| | | | 110/346 |
| 2007/0283681 A1* | 12/2007 | Makkee | B01D 53/90 |
| | | | 60/274 |
| 2009/0173057 A1* | 7/2009 | Yoshida | F01D 15/10 |
| | | | 60/39.281 |
| 2009/0217570 A1* | 9/2009 | Hobson et al. | 44/370 |
| 2011/0048354 A1* | 3/2011 | Hollingshurst | B01F 17/0007 |
| | | | 123/1 A |

* cited by examiner

COMBUSTION PROCESS FOR THE REDUCTION OF PARTICULATES IN COMBUSTION FUMES

CROSS-REFERENCED TO RELATED APPLICATION

This application is a National Stage entry of International Application No. PCT/EP2008/010054, filed Nov. 27, 2008, which claims priority to Italian Patent Application No. MI2007A002291, filed Dec. 6, 2007, the disclosure of the prior application is incorporated in its entirety by reference.

The present invention relates to a combustion process that allows to substantially reduce the thin powders in fumes coming out from a combustor, thus with reduced impact on the environment and on living beings, by using both conventional fuels and low ranking fuels, biomasses or waste.

The emissions of powders from combustion plants are subjected to regulations. Up to date in Europe the more stringent one is the CE 2000/76 regulation, although the powders have been characterized in an undifferentiated way (total weight). This rule fixes the limits for the powders having particle sizes lower than 10 μm (PM 10), and for the concentration of heavy metals. The concentrations of heavy metals, obtained by isokinetic sampling of the flue gas, are referred to the dry gas (dehumidified) volume. In the regulations the concentrations relate to the dry flue gas for the combustion with air and are univocally linked to the mass balance criterion for the emissions, by fixing the oxygen concentration in flue gas at 11% by volume. The regulation specifies that, in the case of combustion with comburent different from air, for instance enriched air or oxygen, correction coefficients are applied according to the mass balance criterion. For example, in case of combustion with oxygen with total conversion of oxygen, the correction coefficient (normalization factor) varies with the fuel type and can be as low as 0.085. The mass balance criterion is widely accepted. For example the BAT classification (Best Available Technology) for emissions uses the mass balance.

At present, for flue gas leaving the combustors, no rule exists for classifying the dangerousness of powders on the basis of their particle size, and therefore there are no reference limits for the particle size. This is likely to happen in the near future, by fixing limits to the powder content having a particle size diameter lower than 2.5 μm (PM 2.5). On this purpose it is sufficient to see the more and more restricted regulations for the powders into the air, for example in the cities of the world. For example a new proposal of European Directive proposal is under discussion to overcome the 96-62-CE rule, which only limits the PM 10 amount to no more than 40 μg/Nm$^3$. The new Directive should introduce a new limit for the PM 2.5 to 20 μg/Nm$^3$ in the air.

Furthermore it has to be taken into account that the PM 2.5 limit according to EPA (National Air Quality Standard) is of 15 μg/Nm$^3$, the value suggested by OMS (World Health Organization) is even lower, i.e. 10 μg/Nm$^3$. Due to this the value of PM 2.5 for the powder will be considered in the technology.

It is known in the prior art that thin powders are contained in flue gas of all industrially used processes. Thin powders are formed of solid particulate having particle diameter lower than 2.5 micrometers (PM 2.5), down to sizes of the order of some nanometers. They are formed both of aggregates of organic molecules, for instance carbonaceous crackings with variable hydrogen and oxygen content (known as soot or diesel particle), and of aggregates of inorganic molecules, for instance salts and/or oxides of alkaline, alkaline-earth and heavy metals, deriving from the incombustible ashes contained in the fed fuel.

The thin powders of organic origin are classified, depending on the shape, into cenospheres and plerospheres.

It is also known that the thin powders cannot be eliminated by the known industrial post-treatment processes of the flue gas, as filtration on sleeve filters (impact filtration), electrofilters (migration in an electrostatic field) or scrubbers, using or aqueous solutions having different pHs, or organic solutions.

The known processes are effective in removing the relatively coarse particulate (having an average particle diameter higher than 2.5 micrometers), but are completely ineffective in removing the fine particulate, in particular that having a particle size lower than 2.5 micrometer, more particularly a size lower than one micrometer. The latter particle size represents the most dangerous particulate fraction for human and animal health. In fact these particles remain in pulmonary alveoli causing severe diseases.

The incombustible ashes, the heavy (non volatile) ones but in particular fly ash, have represented a technological problem in combustion plants for long time. In fact they determined the historical/economic classification of fossil fuels, from natural gas to oil, to coal.

In the prior art combustors operating with a high temperature flame front for melting incombustible ashes (slag-combustors) and for reducing the fly-ash in fumes are also known. In said plants the negative impact of the powders carried by hot flue gas on the efficiency of the energy recovery plants, is decreased. The drawback of these combustors is that the fly-ash are not removed, since ash melting is never quantitative, at most 70-80% of the fly-ash contained in fuels are removed.

For overcoming this, fuels having a low ash content are used. However these fuels are not available in high amounts. Fuel purification processes, as well known, are very expensive. Furthermore it is to be pointed out that the fumes originating from combustors always contain thin powders.

In nature fuels containing ashes, also in remarkable amounts, are very abundant. Besides, the exorbitant increase of the world fuel consumptions and the raising demand for controlling their impact on the environment and on human and animal health, require to have available combustion processes wherein conventional fuels can be used, even those containing ashes also in very high amounts, and contemporaneously with reduced emissions of thin powders in fumes coming out from combustors. Further the above fuels are very common in nature, for example biomasses.

The need was felt to have available an industrial combustion process allowing to reduce thin powder emissions from combustors, whatever was the used fuel.

It has been unexpectedly and surprisingly found a process solving the above mentioned technical problem.

It is an object of the present invention a combustion process wherein a fuel, a comburent and component A) are fed into a combustor, component A) comprising low-melting salts and/or oxides or mixtures thereof, having a melting temperature <1,450 K, the ratio by moles A'/(A"−A') is ≥0.01, being:

A' the sum by moles between the amount of metals, under the form of low-melting salts and/or oxides or mixtures thereof in component A) and the amount of metals, under the form of the low-melting salts and/or low melting oxides contained in the fuel, A" is the sum by moles of the amount of all the metals contained in the fuel and of those contained in component A), in which the combustor is isothermal and flameless.

The ratio by moles A'/(A"−A') is preferably at least 0.1, still more preferably at least 0.2. The upper limit can be very high, for example it can be up to 1,000,000, generally up to 100. It can also reach the infinite value when (A"−A')=0. This happens when all the compounds of the metals present in the fuel are all low-melting compounds, i.e. they melt at a temperature lower than 1,450 K. In this case metal compounds melting at a temperature higher than that indicated above, are absent.

In the process of the present invention there may be the case wherein (A"−A')≠0 or the case wherein (A"−A')=0. It has been surprisingly and unexpectedly found by the Applicant that also in the latter case, the thin powders (PM 2.5) in the fumes at the outlet of the combustor are drastically reduced. It has been found that on the interior walls of the equipments downstream of the combustors no significant deposits of solidified ashes are formed.

The fuel residence time in the combustor preferably ranges from 0.5 seconds up to 30 minutes or more, more preferably from 2 to 10 seconds. It is possible to use also higher residence times, if desired.

The determination of metals present in the fuels is carried out on the fuel ashes by plasma techniques, for example ICP-OES. The fuel ashes are obtained for example according to the ISO 1171 test, or with any pyrolysis method using a temperature of 600° C.

The ash melting temperature can be obtained by using known methods, for example ASTM D 1857-87 test.

For determining the low-melting fraction the fuel ashes are heated to a temperature of 1,450 K and left at this temperature preferably for a time of at least 2 hours. On the melted fraction metals are determined. In particular, the low-melting fraction is isolated from the fuel ashes by using, for example, a melting pot with a hole in the bottom having a 5 mm diameter.

In the invention process the pressure in the combustor is comprised between 101.3 kPa (atmospheric pressure) and up to about 2,000 kPa. The temperature in the combustor is preferably comprised between 1,500 K (1,223° C.) and up to 2,100 K (1,827° C.).

The comburent is preferably oxygen. For example high purity oxygen (98.5% by volume) can be used. Generally oxygen having titre 88-92% VSA (vacuum swing absorption) and 88-92% VPSA (vacuum pressure swing absorption) can also be used. Preferably the lowest limit of the oxygen titre is 70% by volume, the complement to 100% being formed of inert gases and/or nitrogen. The comburent in the process of the invention is preferably used in molar excess with respect to the stoichiometric amount required for the reaction with the fuel. However it can also be used in defect with respect to the stoichiometric amount.

Preferably the combustion gases at the combustor outlet are cooled at a temperature equal to or lower than 1,100 K, in any case lower than the solidification temperature of the condensed vapours of melted ashes. This is an advantage since thermal recovery plants and rotating machines made of conventional materials can be used.

A mixture having a melting temperature ≤1450 K, of one or more compounds A) admixed with high-melting salts and/or high-melting oxides having melting temperature above 1450 K, can also be used as component A). The one or more compounds A) are used in amounts preferably higher than 5% by weight, more preferably up to 30% by weight. An example of high melting compound is bentonite.

Therefore, eutectic compositions or like-eutectic compositions, provided that they have a melting point lower than 1,450 K, can be used in the present invention.

As low-melting salts and/or oxides of compound A), sodium and/or potassium oxides and/or salts, for example sulphates, phosphates and chlorides, alumino silicates of alkaline and alkaline earth metals, etc. can be used. Low-melting mixtures as described above can be easily obtained by the skilled in the field, for example by using "CRC Handbook of Chemistry and Physics" 1996-1997 Ed. or "The American Ceramics Society, www.ceramics.-org/phase".

Other optional components, clays, silica aluminas, etc. can be added into the combustor.

The addition of component A) to the combustor can be carried out by feeding it separately from the fuel preferably in admixture with it.

When component A) is fed separately, it can be for example in the form of an aqueous solution, or suspension.

The Applicant has surprisingly and unexpectedly found that in the fumes coming out from the combustor, operated according to the invention process, the powder amount is drastically reduced and in particular the amount of the ash fraction having particle size lower than or equal to 2.5 μm, more specifically lower than 1 μm, still more specifically lower than 0.4 μm, is drastically reduced.

As fuels usable in the process of the invention there can be mentioned biomasses, for example deriving from sugars, animal meals, carbon, industrial scraps from neutralization reactions, high-boiling refinery fractions, bitumens and oil shales, processing scraps of tar sands, peats, exhausted solvents, pitches, in general industrial process scraps and waste, including the residual fractions from urban waste, optionally comprising CDR (fuel from waste). Emulsions of liquid fuels of oil origin can also be used.

As said, the combustor used in the process of the present invention is isothermal and flameless, since it is operated at temperatures equal to or higher than 1,500 K, preferably higher than 1,700 K up to 2,100 K, and at a pressure higher than 103 kPa (1 bar), preferably higher than 200 kPa, still more preferably higher than 600 kPa and up to 2,026 kPa.

The isothermal combustor used in the invention process is described in the patent application WO 2004/094,904 in the name of the Applicant, herein incorporated by reference.

When the fuel is introduced into the isothermal combustor in admixture with water and/or steam, the combustor operates as described in patent application WO 2005/108,867.

Preferably the fed comburent oxygen is premixed with recycling fumes, the fume amount is generally higher than 10% by volume, preferably higher than 50% by volume. The recycling fumes preferably contain also water, in the form of vapour, generally in amounts, calculated on the total volume of the recycling fumes, higher than 10% by volume, preferably higher than 20% by volume, still more preferably higher than 30% by volume.

The fed comburent can also be in admixture with steam, which can substitute partially or totally the recycling fumes.

The feeding fuel can contain also water/steam in an amount depending on the type of fuel used. The percentage of water in the fuel, expressed as percent by weight, can also be up to 80% and even higher, with the proviso that the value of the lower heating power (LHV)>6,500 kJoule/Kg of the fed mixture.

The gases at the outlet of the combustor are cooled by mixing them in a mixer with the recycling gases up to reaching a final temperature lower than 1,100 K. The fumes can be conveyed to a heat exchanger wherein water is fed to produce steam. The fumes which have been submitted to the heat transfer step are compressed again for recycling to both the combustor and to the mixer, at the combustor outlet. Preferably the fume portion corresponding to the net fume production of the combustion is expanded for obtaining mechanical work and then sent to a fume post-treatment unit. The fumes to be expanded are taken in correspondence of the mixer outlet. The expansion can be achieved by using a turboexpander since the fumes are substantially fly-ash free.

In the lower part of the combustor a collection vessel for the melted ashes is provided. The collected ashes are then cooled, for example in a water bath, and transferred in a solid vitrified state, into static settlers.

It has been unexpectedly and surprisingly found by the Applicant that in the process of the present invention, both the metals present in the fuel and those present in component A), remain under the liquid state in the combustor and are then removed, as said, from the bottom of the combustor. Furthermore the emission value stack for PM 2.5 according to EC 2000/76 standard is reduced to values lower than 50 micrograms/Nm$^3$.

Process control for determining particles having particle size diameter <2.5 micrometers is performed by using sensors located in the fumes at the outlet of the combustor. For example an opacimeter can be used. In particular an instrument ELPI (Electrical Low Pressure Impactor) can be used. This operates by continuously scanning the PUF (Ultra Fine Particulate), generally having 2.5-0.01 µm particle sizes, with a 10 minutes frequency. This supplies the required information for the dosing of compound A) in the combustor in order to maintain the total PUF content well below the above concentrations, some orders of magnitude lower than what reported in the prior art, for example in BATs.

As said, it has been surprisingly and unexpectedly found by the Applicant that the invention process is particularly effective in retaining at the melted state in the combustor also those heavy metals which normally are present in the fumes in remarkable amounts in the form of thin powders. For example, in the prior art it is well known that cadmium, under the form of the CdO oxide, volatilizes in the prior art combustion processes and is totally found as ultrafine thin particulate in fumes and passes practically unaltered through the fume post-treatment plants. On the contrary, under the conditions used in the process of the present invention, cadmium oxide is almost completely removed from the fumes discharged into the atmosphere.

With the process of the present invention also other heavy metals, for example manganese, copper, chromium, vanadium, lead can be removed almost quantitatively.

The process of the present invention further allows a significant reduction or even the removal of vanadium from combustion fumes, which instead is particularly difficult with the prior art processes. The metal is present in crude oils, in insignificant amounts in heavy crudes, in bitumens, in shales and in tar sands, as well as in waste heavy fractions of oil processings. Vanadium, as known, is a toxic heavy metal.

At the combustion temperatures used in the process of the present invention vanadium is generally under the form of $V_2O_5$ oxide, which is a high-melting solid. At temperatures higher than 1,670 K $V_2O_5$ is transformed into the volatile $VO_2$. In addition, $V_2O_5$ catalyzes the conversion of $SO_2$ to $SO_3$, which is a particularly aggressive gas, due to the formation of sulphuric acid, which is deposited on the walls of the plants downstream of the combustor, at the temperatures at which the thermal recovery plants are operated.

It has been surprisingly found that, with the process of the invention, by operating at combustion temperatures from 1,500 K up to <1,670 K, it is possible to significantly reduce, or even remove, the amount of vanadium in fumes.

With the process of the present invention it is thus possible to use also low-ranking fuels, which cannot be used with the prior art combustors.

Furthermore it is possible to combine a Joule-Bryton cycle with the combustor of the invention, for example pressurized at 1,000 kPa, followed by turboexpansion on net fume production, and a Rankine cycle on the heat recovered from hot gases, before recycling them to the combustor and to the fume mixer-cooler. In this way transformation yields from thermal energy into electric energy higher than 57% can be reached.

The following examples illustrate with non limitative purposes the present invention.

EXAMPLES

Example 1

Characterization of Powders

The particulate contained in combustion fumes is collected by an Andersen Mark III type impactor equipped with a pre-separator capable to remove the particles with aerodynamic diameter greater than 10 µm and to separate PM 10, by using a sampling flow of 14 liters/min, and filters for granulometric fractions with aerodynamic diameter in the range 10-9 µm; 9-5.8 µm; 5.8-4.7 µm; 4.7-3.3 µm; 3.3-2.1 µm; 2.1-1.1 µm; 1.1-0.7 µm; 0.7-0.4 µm.

At the end of the sampling procedure, the collected particulate fractions have been subjected to chemico-physical analysis by scanning electronic microscopy (SEM) and X-ray analysis.

The particle chemical analysis has been carried out with a SEM Philips XL30 microscope, equipped with a thin window EDX system for the microanalysis by energy dispersion spectrometry, by using an automatic system capable to automatically detect the particles when a predetermined threshold is exceeded.

The morphological parameters and the composition have been determined for each of the identified particles by measuring the intensities of the lines characteristic of the X-ray spectrum, then converted into the corresponding atomic concentrations.

The particulate with sizes smaller than 0.4 µm, that escapes from the last stage of the Andersen impactor, has been collected on mica supports for the analysis by atomic force microscope by a pneumatic actuator capable to collect, by thermophoretic effect, a sufficient and statistically significant number of particles. The gaseous current coming out from the impactor is then sent to a condensation system of the combustion steam. The condensed phase has then been subjected to spectroscopic analysis for determining the concentration of the nanometric particulate (<0.4 µm).

The analysis for metals is carried out by induction-plasma spectroscopy by using the ICP-OES instrument by Thermo Electron Corporation.

Ashes of fuels are determined according to the ISO 1171 test. The fuels are pyrolyzed at 600° C. until constant weight.

Ash melting temperature is determined according to the ASTM D 1857-87 test.

The low-melting fraction of the fuel ashes is determined by using a melting pot with a hole at the bottom having a diameter of 5 mm. The fuel ash sample is heated at 1,450 K and left at this temperature for at least 2 hours. Then the weight of the melted fraction which flows from the bottom of the melting pot is determined. On said fraction metal determination is carried out.

Example 2

An isothermal and flameless 5 MW combustor, operated at 1,650 K and at the pressure of 5 bar and by using oxygen as comburent at 92% by volume, in excess on the stoichiometric amount, so to have an oxygen concentration in the fumes coming out from the combustor comprised between 1% and 3% by volume. An industrial waste is also fed at a rate of 11 kg/min, constituted of a mixture of exhausted solvents, water and a solid insoluble residue in an amount of 1.4% by weight on the total waste weight.

The analysis of the waste has given an incombustible ash amount equal to 1.04% by weight. By the optical ICP analysis (inductive coupled plasma: ICP-OES) it is found that the ashes are formed mainly of alumina, silica and calcium (calcium sulphate). The ashes further contain heavy metals, among which Nickel, Manganese, Cobalt, Chromium, Copper, Lead, in a total concentration by weight of 370 ppm weight.

The melting temperature of the incombustible ashes is of 1,712 K.

0.5 l/min of an aqueous suspension of the following composition is fed into the combustor:

10% by weight of commercial bentonite in powder having composition about $Al_2O_3.4SiO_2$, melting temperature 1,590 K, 3% by weight of commercial potassium pyrophosphate, having melting temperature 1,363 K.

By optical ICP analysis the metals in component A), in the optional component bentonite and in the fuel are determined. It has been found that the molar ratio A'/(A"−A') is equal to 0.1.

Total powders in the fumes at the outlet of the combustor are found to be 0.02 mg/Nm$^3$.

After filtration of the fumes on flue filter sleeve, in the fumes emitted into the air it is found that PM 2.5 is 8 μg/Nm$^3$. It is noted that both the above values are very low.

In the fumes emitted into the air the normalized concentration values of heavy metals are lower than 1 μg/Nm$^3$.

Example 3 Comparative

Example 2 is repeated but omitting the addition of the aqueous suspension of bentonite and potassium pyrophosphate.

It is found that in the fumes emitted into the air the particulate PM 2.5 is 3 mg/Nm$^3$, and the heavy metal content is of 0.15 mg/Nm$^3$.

Example 4 Comparative

In a prior art thermal 6 MW combustor, operated at atmospheric pressure and using air as comburent, 13 kg/min of the same industrial waste used in example 2 are fed. The walls of the combustor are maintained at a temperature higher than 1,150 K. The fumes leave the combustion chamber at the temperature of 1.310 K.

After filtration of the combustion fumes on a sleeve filter and on an electrostatic filter, the fumes emitted into the air contain an amount of powders of 9 mg/Nm$^3$. PM 2.5 is 6 mg/Nm$^3$, heavy metals 0.44 mg/Nm$^3$.

By comparing the data obtained in the example of the invention with those of the comparative examples it is noticed that the powders in the fumes discharged into the atmosphere in the process of the invention are much lower than those obtained in the prior art processes. The PM 2.5 is lower of two-three orders of magnitude and the heavy metal content lower of two orders of magnitude than in the comparative examples.

Therefore with the process of the present invention a remarkable improvement in the reduction of emitted powders and heavy metals is obtained in comparison with the prior art processes.

The invention claimed is:

1. A combustion process for removing particle size diameter lower than 2.5 μm (PM 2.5) to values lower than 50 μm/Nm$^3$ from combustion fumes wherein a fuel, a comburent, optionally premixed with recycling fumes, and component A) are fed to a combustor, component A) comprising low-melting salts and/or oxides and/or mixtures thereof having a melting temperature, comprising a melting point <1,450 K, the ratio by moles A'/(A"−A') is >0.01, being:

A' the sum by moles between an amount of metals, under the form of low-melting salts and/or oxides and/or mixtures thereof present in the component A) and an amount of metals under the form of the low-melting salts and/or oxides or mixtures thereof contained in the fuel, A" is the sum of the amount of all the metals contained in the fuel and of those contained in component A), in which the combustor is isothermal type and flameless, wherein the comburent is oxygen and is used in molar excess with respect to a stoichiometric amount for combustion reaction with the fuel, wherein the titre of oxygen is at least 70% by volume, the complement to 100% being formed of inert gases and/or nitrogen;

wherein metals present in the fuel and in component A) remain under a liquid state in the combustor and are removed from a bottom of the combustor; and wherein the pressure in the combustor is higher than the atmospheric pressure and up to 2,000 kPa and the temperature is comprised between 1,500 K (1,223° C.) and up to 2,100 K (1,827° C.).

2. A process according to claim 1, wherein the ratio by moles A'/(A"−A') is at least 0.1.

3. A process according to claim 1, wherein the combustion gases at the combustor outlet are cooled at a temperature equal to or lower than 1,100 K.

4. A process according to claim 1, wherein as component A) a mixture having melting temperature <1,450 K is used consisting of one or more compounds as defined in A) and of salts and/or oxides having melting temperature above 1,450 K.

5. A process according to claim 1, wherein component A) is fed to the combustor separately from the fuel or in admixture with the fuel.

6. A process according to claim 1, wherein the fuel residence time in the combustor ranges from 0.5 seconds up to 30 minutes.

7. A process according to claim 1, wherein oxygen is premixed with recycling fumes, the recycling fume amount being higher than 10% by volume.

8. A process according to claim 7, wherein the recycling fumes contain water under the vapor form in an amount higher than 10% by volume calculated on the total volume of recycling fumes.

9. A process according to claim 1, wherein the fuel contains water/vapor in an amount, expressed as percent by weight, up to 80%.

10. Fumes obtainable according to a combustion process for removing particle size diameter lower than 2.5 μm (PM 2.5) to values lower than 50 μm/Nm³ from combustion fumes wherein a fuel, a comburent, optionally premixed with recycling fumes, and component A) are fed to a combustor, component A) comprising low-melting salts and/or oxides and/or mixtures thereof having a melting temperature, comprising a melting point <1,450 K, the ratio by moles A'/(A"−A') is >0.01, being:

A' the sum by moles between an amount of metals, under the form of low-melting salts and/or oxides and/or mixtures thereof present in the component A) and an amount of metals under the form of the low-melting salts and/or oxides or mixtures thereof contained in the fuel, A" is the sum of the amount of all the metals contained in the fuel and of those contained in component A), in which the combustor is isothermal type and flameless, wherein the comburent is oxygen and is used in molar excess with respect to a stoichiometric amount for combustion reaction with the fuel, wherein the titre of oxygen is at least 70% by volume, the complement to 100% being formed of inert gases and/or nitrogen;

wherein metals present in the fuel and in component A) remain under a liquid state in the combustor and are removed from a bottom of the combustor;

wherein the pressure in the combustor is higher than the atmospheric pressure and up to 2,000 kPa and the temperature is comprised between 1,500 K (1,223° C.) and up to 2,100 K (1,827° C.); and wherein a concentration of the PM 2.5 is lower than 50 μg/Nm³.

11. A process according to claim 2, wherein the ratio by moles A'/(A"−A') is at least 0.2.

12. A process according to claim 1, comprising: removing particles having particle size diameter lower than 2.5 μm (PM 2.5) from the combustion fumes.

* * * * *